United States Patent [19]

Kapolnek

[11] Patent Number: 5,505,125
[45] Date of Patent: Apr. 9, 1996

[54] METHOD AND APPARATUS FOR FORMING A ROTARY EMBOSSING DIE WITH A SUPPORT PLATE

[75] Inventor: Paul G. Kapolnek, Chicago, Ill.

[73] Assignee: Western Printing Machinery Company, Schiller Park, Ill.

[21] Appl. No.: 131,331

[22] Filed: Oct. 4, 1993

[51] Int. Cl.⁶ .................................. B31F 1/07
[52] U.S. Cl. ................ 101/23; 101/32; 101/22; 101/28
[58] Field of Search .................. 101/18, 22, 23, 101/24, 25, 28, 29, 32, 375, 378, 383

[56] References Cited

U.S. PATENT DOCUMENTS

| | | |
|---|---|---|
| 2,060,082 | 11/1936 | Johnson et al. ............ 101/383 |
| 2,263,893 | 11/1941 | Schulman .................. 101/23 |
| 3,264,978 | 8/1966 | Staley . |
| 3,537,395 | 11/1970 | Prince ....................... 101/378 |
| 3,560,289 | 2/1971 | Otto et al. . |
| 3,566,789 | 3/1971 | Hecht ......................... 101/378 |
| 3,619,446 | 11/1971 | Nauta . |
| 3,824,927 | 7/1974 | Pugh et al. ................. 101/378 |
| 3,893,795 | 7/1975 | Nauta . |
| 3,932,245 | 1/1976 | Erb et al. . |
| 3,970,001 | 7/1976 | Mollon et al. ............ 101/415.1 |
| 4,059,000 | 11/1977 | Bodnar . |
| 4,074,556 | 2/1978 | Takeda et al. . |
| 4,159,677 | 7/1979 | Smith . |
| 5,007,271 | 4/1991 | Boegli . |

FOREIGN PATENT DOCUMENTS 1540958  10/1968  France .

Primary Examiner—Ren Yan
Assistant Examiner—Lynn D. Hendrickson
Attorney, Agent, or Firm—Willian Brinks Hofer Gilson & Lione

[57] ABSTRACT

A rotary embossing die includes a curved metallic plate having an inner and an outer surface. An embossing design is etched on the outer surface of the metallic plate and an epoxy-based support plate is formed on the inner surface of the metallic plate. The metallic plate and the support plate preferably cooperate to define a shoulder. Die clips positioned around the shoulder are used to fasten the embossing die to the die cylinder of a rotary embossing machine. The metallic plate can be formed from brass or magnesium, and is preferably curved to any suitable radius.

18 Claims, 3 Drawing Sheets

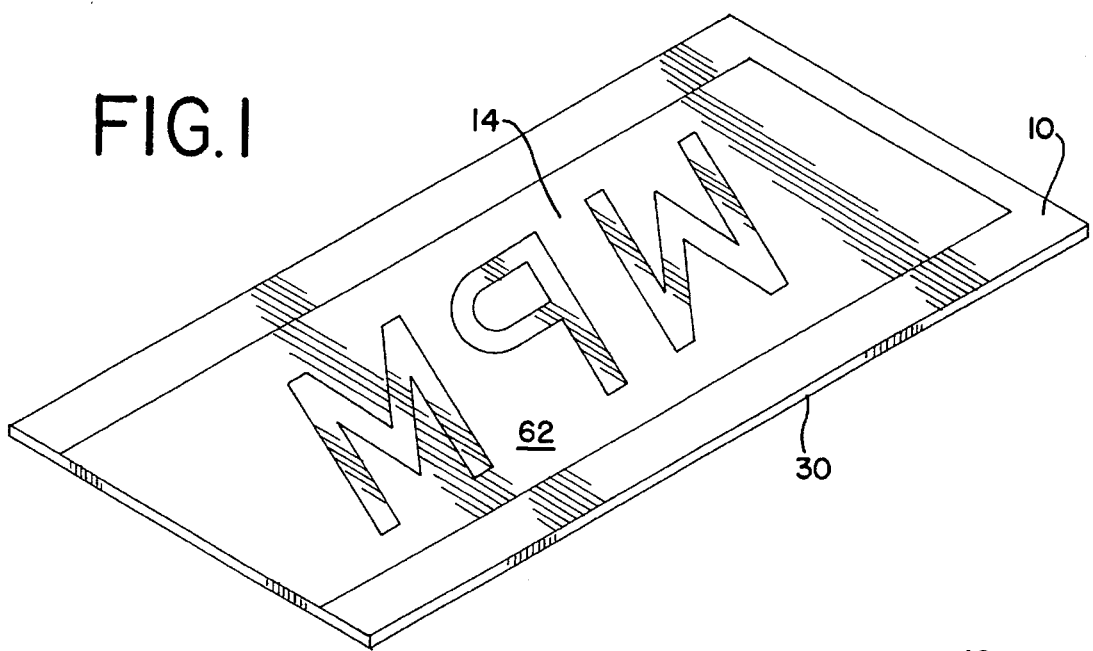
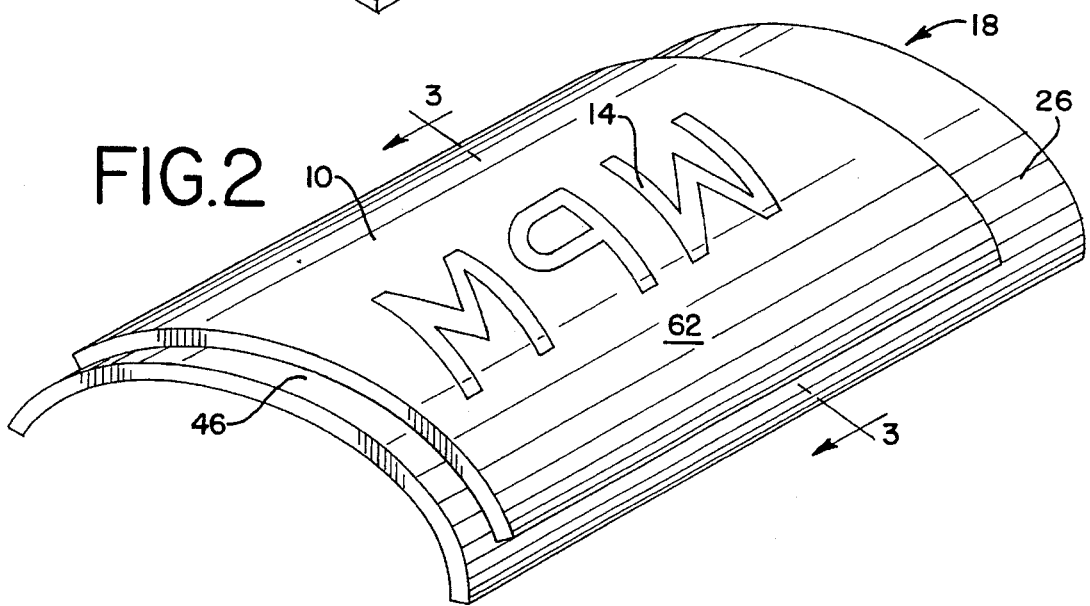
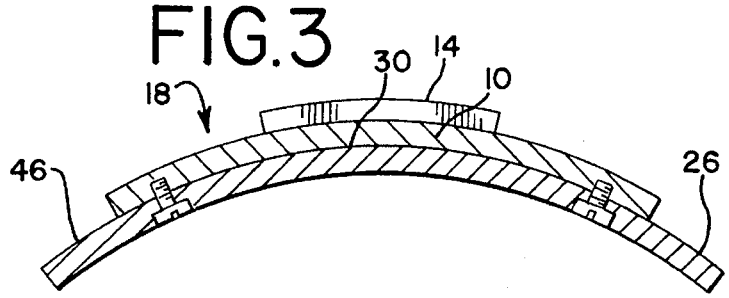

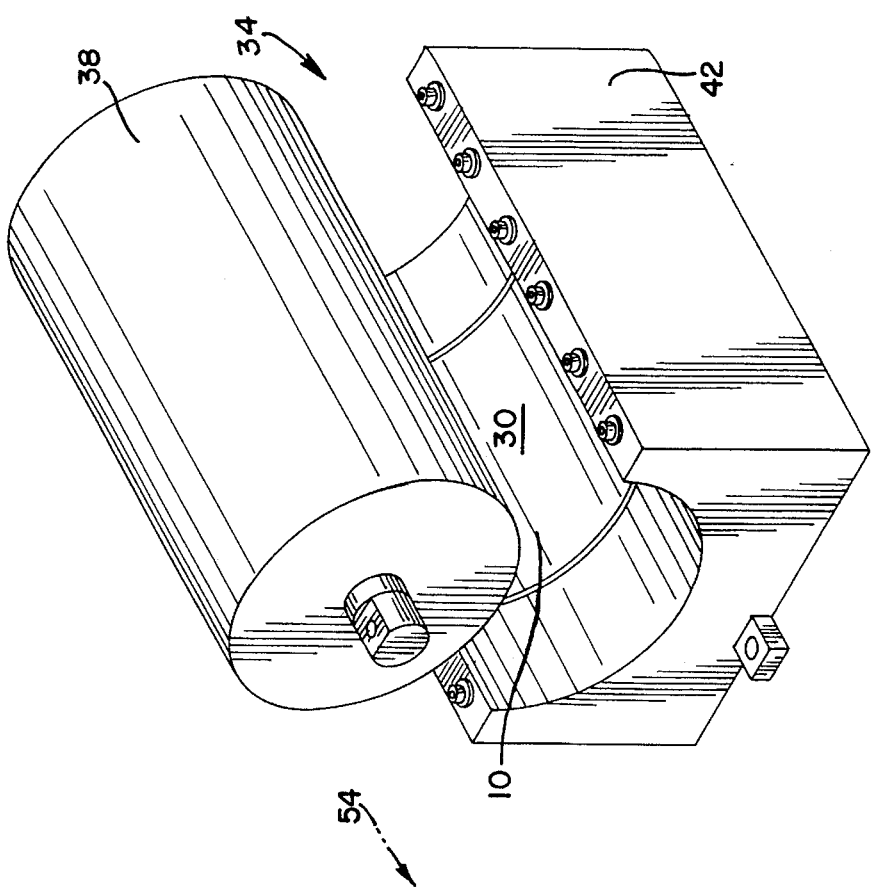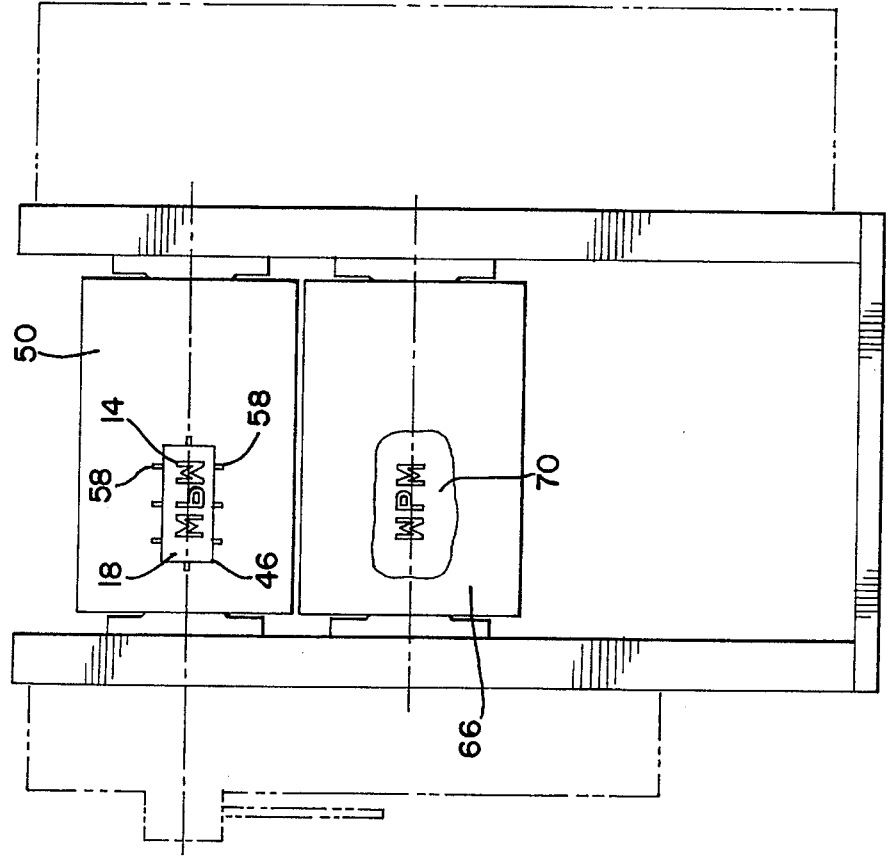

METHOD AND APPARATUS FOR FORMING A ROTARY EMBOSSING DIE WITH A SUPPORT PLATE

BACKGROUND OF THE INVENTION

The present invention relates generally to the field of rotary die embossing, and more particularly to rotary embossing dies and a method for making and using such dies.

Although they are relative newcomers to the centuries-old printing and embossing trade, rotary embossing machines and their attendant dies have been manufactured and used for numerous years. Conventionally, rotary embossing dies are formed of resinous or metallic material and cover, or are integrally formed with, the surface of an embossing machine die-cylinder. Additionally, conventional metallic dies are generally thick (approximately ¼" to ½") and, therefore, heavy and difficult to manipulate.

Conventional embossing dies have been successfully used in the embossing field. However, because they cover, or are integrally formed with, the entire surface of a die cylinder, they are often cumbersome and costly to use. Thus, if an embossing design is required to be changed or an embossing die needs to be replaced, the die cylinder must be removed from the embossing machine and replaced with a new cylinder (if the embossing die is integrally formed with the die cylinder), or the embossing die must be removed from substantially the entire surface of the die cylinder. Because separate die cylinders are often required for each embossing design, and the replacement of embossing dies is a time consuming process, the use of conventional rotary embossing dies results in increased die costs and lengthy embossing machine down-time when changing dies.

A typical three-step process for forming rotary embossing dies includes first etching or otherwise forming a desired embossing shape or design on a metallic plate. Second, a negative image of the embossing design is formed on a rubber mat (or other flexible material) by a flexoplating or etching technique, as is commonly known in the art. Lastly, the rubber mat is placed face-up (i.e., with the design exposed) in a die mold and an epoxy material is injected into the mold to form an epoxy die plate having a positive image of the design. The resultant epoxy rotary die plate is then used on a rotary embossing machine to form embossed images of the design originally present on the metallic plate on paper, or other suitable material.

While the above-described method of forming rotary embossing dies has produced satisfactory rotary embossing dies, there are a number of associated problems and/or disadvantages. For example, the sharpness of the original design is reduced through transfers of the design to a flexible, soft material such as the rubber mat and, subsequently, to the epoxy die plate. This reduction in sharpness directly translates to the final embossed product and results in embossments that are not as clear, sharp and distinct as the desired original design. Also, because epoxy rotary die plates do not wear as well as regular metallic die plates, there is a frequent need to replace the epoxy die plates, which further increases down-time and costs.

SUMMARY OF THE INVENTION

According to a first aspect of the invention, a method of forming a rotary embossing die is provided, which includes the steps of: providing a flat metallic plate having an inner surface and an outer surface; forming a design on the outer surface of the metallic plate; curving the metallic plate to a predetermined radius; and forming a support plate on the inner surface of the metallic plate.

According to a second aspect of the invention, a method of embossing is provided, which includes the steps of: providing a rotary die comprising a flat metallic plate having an inner surface and an outer surface; forming an embossing design on the outer surface of the metallic plate; curving the metallic plate to a predetermined radius; forming a support plate on the inner surface of the metallic plate; mounting the rotary die to a die cylinder of a rotary embossing machine; and feeding an embossment material between the die cylinder and an opposing cylinder such that the rotary embossing die imparts an embossed design on the embossment material.

According to a third aspect of the invention, a rotary embossing die includes: a metallic plate having an inner surface and an outer surface, the metallic plate being curved to a predetermined radius; an embossing design formed on the outer surface of the curved metallic plate; and a support plate formed on the inner surface of the curved metallic plate, the support plate and the metallic plate defining a shoulder between the support plate and the metallic plate for securing the embossing die to a rotary embossing machine.

According to a fourth aspect of the invention, a rotary embossing machine includes: a die cylinder; a rotary embossing die mounted on a discrete section of the die cylinder, the rotary embossing die including a metallic plate having an inner surface and an outer surface, the metallic plate being curved to fit the radius of the die cylinder, an embossing design formed on the outer surface of the metallic plate, and a support plate formed on the inner surface of the curved metallic plate, the support plate and the metallic plate defining a shoulder between the support plate and the metallic plate for securing the embossing die to the rotary embossing machine; and an opposing cylinder positioned in opposite rotary relationship to the die cylinder, the opposing cylinder and the rotary embossing die cooperating to impart the embossing design on an embossment material.

The present invention provides a rotary embossing die for use on a discrete section of a die cylinder. The rotary embossing die includes a thin metallic plate that is relatively light-weight and, thereby, allows the embossing die to be easily removed from the die cylinder. By providing a two-step method for forming rotary embossing dies, the present invention eliminates the extra forming step, and the attendant increased costs, that is present in the conventional die-formation method. Also, the present invention provides a method for forming a rotary embossing die having increased wear capabilities over conventional epoxy embossing dies. Importantly, the present invention improves the sharpness reduction that occurs when the design image is transferred between different die plate media.

These and other features and advantages of the present invention will become apparent to those skilled in the art upon review of the following detailed description of the presently preferred embodiments of the invention taken in conjunction with the accompanying drawings.

BRIEF DESCRIPTION OF THE DRAWINGS

FIG. 1 is a perspective view of a flat metallic plate having an embossing design thereon;

FIG. 2 is a perspective view of a rotary embossing die formed in accordance with the present invention;

FIG. 3 is a cross-sectional view taken along line 3—3 of FIG. 2;

FIG. 6 is a schematic view of a rotary die machine having a rotary embossing die mounted thereon; and FIG. 7 is an exploded perspective view of a rotary embossing die mold.

DETAILED DESCRIPTION OF THE PRESENTLY PREFERRED EMBODIMENTS

Figure 4:
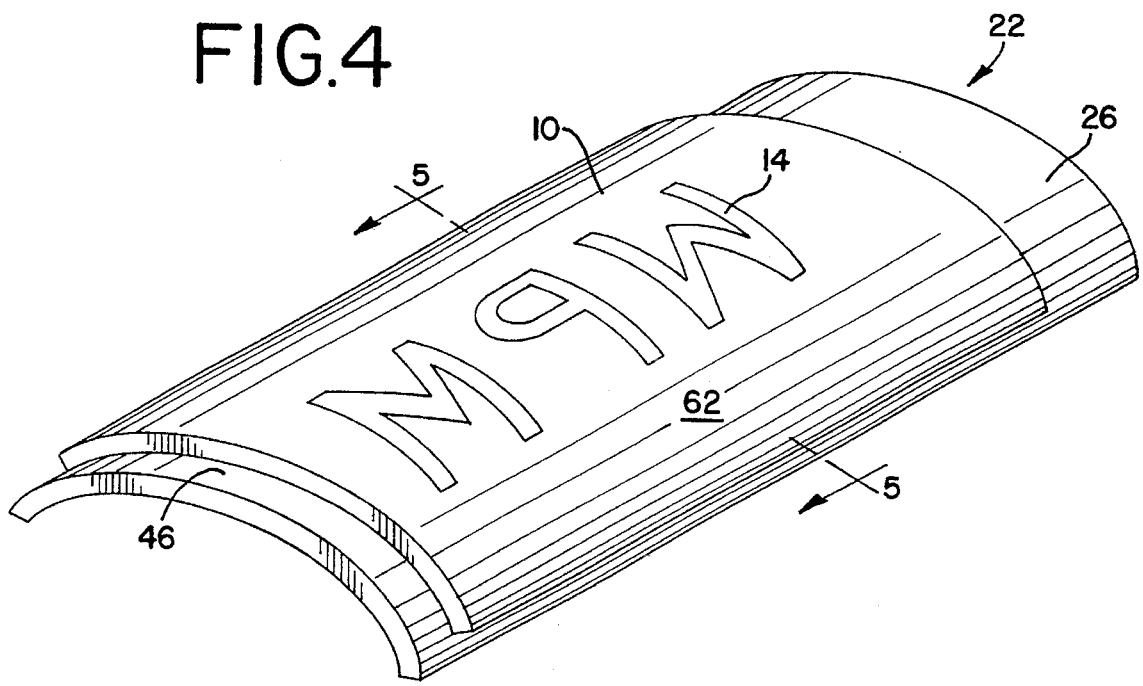
FIG. 4 is a perspective view of a rotary embossing die having a different radius of curvature than the embossing die shown in FIG. 2.

Referring now to the drawings, FIG. 1 shows a flat metallic plate 10 having an inner surface 30 and an outer surface 62. An embossing design 14 is chemically etched or otherwise formed on the outer surface 62 of the metallic plate 10.

Preferably, the metallic plate 10 is formed of brass or magnesium and is 1/32" to 1/16" thick. However, the plate 10 may be formed of any suitable metallic material and may be of any suitable thickness. Additionally, the design 14 is preferably a "single level" embossing design, although a "multiple level" design may also be formed on the metallic plate 10.

As best shown in FIG. 2, a rotary embossing die 18 comprises the metallic plate 10 and an epoxy-based support plate 26 formed on the inner surface 30 of the plate 10. The rotary embossing die 18 is formed by curving the metallic plate 10 to a desired or predetermined radius of curvature, and then forming the support plate 26 on the inner surface 30 of the metallic plate 10.

Figure 5:
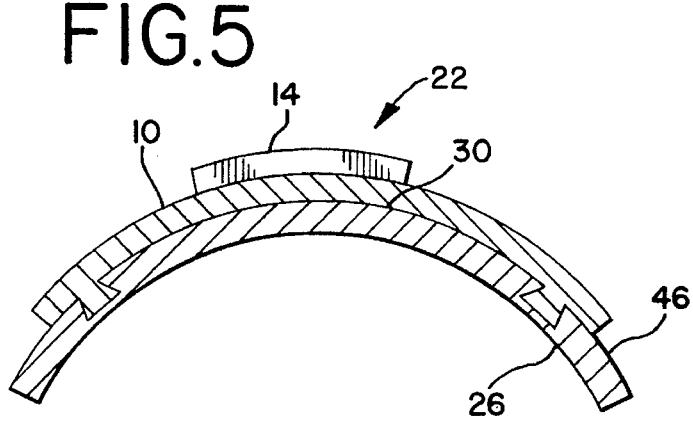
FIG. 5 is a cross-sectional view taken along line 5—5 of FIG. 4.

(FIGS. 4–5 show a second rotary embossing die 22 formed according to the present invention. The rotary embossing dies 18, 22 are identical except for, as best shown in FIGS. 3 and 5, their different radii of curvature.)

Because the surface area of the outer surface 62 of the metallic plate 10 is increased when the plate 10 is curved, the size of the embossing design 14 may be required to be increased before the design 14 is formed on the plate 10. As is known in the art, the required size increase may be determined by means of mathematical formulas which account for, among other things, the radius of curvature of the embossing die 18.

Specifically regarding the formation of the embossing die 18, the metallic plate 10 is curved to the predetermined radius of curvature in a three-roll curver (not shown). As shown in FIG. 7, the curved metallic plate 10 is then placed "face-down" (i.e., with its inner surface 30 exposed) in the base 42 of a rotary die mold 34. After the mold cylinder 38 is lowered onto the inner surface 30 of the metallic plate 10 and the mold 34 is sealed, epoxy-based support plate material (preferably having a low shrink factor) is injected into the mold 34 at ambient temperature. The epoxy-based material is cured at 180° F. for approximately one hour, until the epoxy hardens and forms the support plate 26 on the metallic plate 10. After the epoxy is sufficiently cured, the mold cylinder 38 is raised and the resultant rotary embossing die 18 is removed from the die mold 34.

Before the metallic plate 10 is placed in the die mold 34, the inner surface 30 thereof may be abraded or "roughed" to increase the adhesion of the support plate material to the metallic plate 10. Also, to firmly secure the metallic plate 10 to the support plate 26, at least one section of the metallic plate 10 may be cut and notched (i.e., dovetailed) such that it will extend into the support plate when the embossing die 18 is formed.

As shown in FIG. 6, the rotary embossing die 18 is preferably sized to be mounted on a discrete section of the die cylinder 50 of the rotary embossing machine 54. (If desired, however, the rotary embossing die of the present invention may be constructed to cover substantially the entire die cylinder 50.) To properly fit on the die cylinder 50, the radius of curvature of the embossing die 18 must match that of the die cylinder 50.

As best shown in FIGS. 2–5, the die mold 34 is constructed such that a shoulder 46 is formed between the metallic plate 10 and the support plate 26 of the rotary embossing die 18. The embossing die 18 is mounted on the die cylinder 50 by means of a plurality of die clips 58 secured between the shoulder 46 of the embossing die 18 and the die cylinder 50. The shoulder 46 provides sufficient clearance between the support plate 26 and the outer surface 62 of the metallic plate 10 for the clips 58 to secure the embossing die 18 to the die cylinder 50 without interfering with the embossing operation performed by the embossing machine 54.

The rotary embossing machine 54 shown in FIG. 6 also includes an opposing cylinder 66 positioned opposite the die cylinder 50. During the operation of the embossing machine 54, embossment material (e.g., paper) (not shown) is fed between the die cylinder 50 and the opposing cylinder 66, and the rotary embossing die 18 imparts the embossing design 14 on the embossment material.

The opposing cylinder 66 preferably has an opposing material 70 positioned thereon in opposite relationship to the embossing die 18. The opposing material 70, preferably an epoxy-based material, is spread on the opposing cylinder 66 before the embossing operation is commenced. After the opposing material 70 is sufficiently cured, i.e., not tacky to the touch, the embossing machine 54, and thus the die cylinder 50 and the opposing cylinder 66, is turned through one rotation so that the embossing die 18 and the opposing material 70 contact one another. This rotational engagement results in a negative image of the embossing design 14 being formed on the opposing material 70.

During the embossing operation, the positive image of the design 14 on the embossing die 18 and the negative image of the design 14 on the opposing material 70 cooperate to increase the embossed effect on the embossed material (e.g., paper) processed through the embossing machine 54. Preferably, so as not to distort the negative image of the design 14 formed on the opposing material 70, the opposing material 70 is preferably formed of an epoxy material having a low shrink factor.

The following materials are suitable for use in the present invention: the metallic plate 10 may be formed of brass or magnesium; the epoxy support plate material is Epoxical 301 supplied by U.S. Gypsum, which has a low shrink factor; and the opposing material 70 is BondAide P-1500. Alternately, the metallic plate 10, the support plate material and the opposing material 70 may be formed of any material suitable for the application.

As can be readily seen, it is contemplated that numerous individual embossing dies may be mounted on a single die cylinder. Therefore, a variety of embossing designs may be formed from the combination of individual embossing dies. Also, because of the relative light-weight and small size of the embossing dies 18 of the present invention, the embossing dies 18 may be easily removed from or added to a die cylinder to form a completely new design. Furthermore, because the embossing die 18 includes a metallic plate 10, the die 18 will wear well.

It should be appreciated that the present invention may be performed or configured as appropriate for the application. The embodiments described above are to be considered in all respects only as illustrative and not restrictive. The scope of the invention is indicated by the following claims rather than by the foregoing description. All changes which come within the meaning and range of equivalency of the claims are to be embraced within their scope.

I claim:

1. A method of forming a rotary embossing die, comprising the following steps:
    providing a flat metallic embossing plate comprising an inner surface and an outer surface;
    forming a raised embossing surface on the outer surface of the metallic embossing plate;
    curving the metallic embossing plate to a predetermined radius;
    placing the curved metallic embossing plate in a mold;
    exposing the inner surface of the metallic embossing plate;
    abrading the inner surface of the metallic embossing plate;
    injecting support plate material into the mold;
    causing the support plate material to contact the inner surface of the metallic embossing plate; and
    curing the support plate material to form the support plate.

2. The method of claim 1 wherein the metallic plate comprises a material selected from the group consisting of brass and magnesium.

3. The method of claim 1 wherein the metallic plate is approximately 1/32" to 1/16" thick.

4. The method of claim 1 wherein the embossing surface is formed by a chemical etch.

5. The method of claim 1 wherein the support plate comprises an epoxy-based material.

6. The method of claim 1 wherein at least one section of the metallic plate is notched such that the at least one section extends into the support plate material to firmly secure the metallic plate to the support plate.

7. The method of claim 1, further comprising the step of providing a die cylinder, and further wherein the support plate extends beyond the periphery of the metallic plate, the support plate and the metallic plate defining a shoulder between the support plate and the metallic plate for allowing the rotary embossing die to be secured to the die cylinder.

8. A method of embossing, comprising the following steps:
    providing a rotary embossing die comprising a flat metallic embossing plate having an inner surface and an outer surface;
    forming a raised embossing surface on the outer surface of the metallic embossing plate, the embossing surface forming a positive image of a design;
    curving the metallic embossing plate to a predetermined radius;
    forming a support plate on the inner surface of the metallic embossing plate;
    providing a rotary embossing machine having a die cylinder and an opposing cylinder;
    mounting the rotary embossing die to the die cylinder of the rotary embossing machine;
    providing an embossing material comprising a negative image of the design;
    aligning the embossing material on the opposing cylinder with the embossing die on the die cylinder;
    feeding an embossment material between the die cylinder and the opposing cylinder;
    deforming the embossment material between the embossing die on the die cylinder and the embossing material on the opposing cylinder such that the rotary embossing die imparts the design on the embossment material.

9. The method of claim 8 wherein the support plate extends beyond the periphery of the metallic plate, the support plate and the metallic plate defining a shoulder between the support plate and the metallic plate for allowing the rotary die to be secured to the die cylinder.

10. The method of claim 9 wherein the rotary embossing die is mounted on the die cylinder by a plurality of die clips secured between the shoulder of the rotary embossing die and the die cylinder.

11. The method of claim 8 wherein the die cylinder defines an outer surface comprising a plurality of sections, and further wherein the rotary embossing die is mounted on at least one of the sections of the outer surface of the die cylinder.

12. The method of claim 8 wherein the step of forming the support plate comprises the steps of:
    placing the curved metallic plate in a mold;
    exposing the inner surface of the metallic plate;
    injecting support plate material into the mold;
    causing the support plate material to contact the inner surface of the metallic plate; and
    curing the support plate material to form the support plate.

13. A rotary embossing machine comprising:
    a die cylinder defining an outer surface comprising a plurality of sections;
    a rotary embossing die removably mounted on at least one of the sections of the die cylinder, the rotary embossing die comprising
        a metallic embossing plate having an inner surface and an outer surface, the metallic plate being curved to fit the radius of the die cylinder, a raised embossing surface formed on the outer surface of the curved metallic plate to emboss a positive image of a design on a material fed through the rotary embossing machine, and a support plate formed on the inner surface of the metallic plate, the support plate and the metallic plate defining a shoulder between the support plate and the metallic plate for securing the embossing die to the rotary embossing machine;
    an opposing cylinder positioned in opposite rotary relationship to the die cylinder, the opposing cylinder having an outer surface; and
    an opposing embossing material positioned on the outer surface of the opposing cylinder, the opposing embossing material having a raised surface forming a negative image of the design, the rotary embossing die and the opposing embossing material cooperating to deform the material fed through the rotary embossing machine to impart the design on the material.

14. The rotary embossing machine of claim 13 wherein the rotary embossing die is mounted on the die cylinder by a plurality of die clips secured between the shoulder of the embossing die and the die cylinder.

15. The rotary embossing machine of claim 13 wherein the metallic plate is approximately 1/32" to 1/16" thick.

16. The rotary embossing die of claim 13 wherein the support plate comprises an epoxy-based material.

17. The rotary embossing die of claim 13 wherein at least one section of the metallic plate is notched such that the at least one section extends into the support plate to firmly secure the metallic plate to the support plate.

18. A rotary embossing machine comprising:

a die cylinder defining an outer surface comprising a plurality of sections;

a rotary embossing die removably mounted on at least one of the sections of the die cylinder, the rotary embossing die comprising a metallic embossing plate having an inner surface and an outer surface, the metallic plate being curved to fit the radius of the die cylinder, a raised embossing surface formed on the outer surface of the metallic plate to emboss a positive image of a design on a material fed through the rotary embossing machine, and means for supporting the metallic plate formed on the inner surface of the metallic plate, the means for supporting and the metallic plate defining a shoulder between the means for supporting and the metallic plate for securing the embossing die to the rotary embossing machine; and an opposing cylinder positioned in opposite rotary relationship to the die cylinder, the opposing cylinder having an outer surface; and an opposing embossing material positioned on the outer surface of the opposing cylinder, the opposing embossing material having a negative image of the design, the rotary embossing die and the opposing embossing material cooperating to deform the material fed through the rotary embossing machine to impart the design on the material.

* * * * *